(12) United States Patent
Breau et al.

(10) Patent No.: US 8,499,338 B1
(45) Date of Patent: Jul. 30, 2013

(54) INTERNET PROTOCOL CONTROLLED MODEM FOR USE OVER A WIRELESS VOICE NETWORK

(75) Inventors: Jeremy R. Breau, Leawood, KS (US); Sei Y. Ng, Olathe, KS (US); John Eric Belser, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 504 days.

(21) Appl. No.: 12/706,052

(22) Filed: Feb. 16, 2010

(51) Int. Cl.
*G06F 21/00* (2006.01)

(52) U.S. Cl.
USPC ............. 726/4; 713/186; 725/111; 726/18; 726/19; 726/20; 726/21

(58) Field of Classification Search
USPC ...... 726/4, 18–21; 725/111; 713/185; 463/41
See application file for complete search history.

(56) References Cited

U.S. PATENT DOCUMENTS

| | | | |
|---|---|---|---|
| 4,837,800 A | 6/1989 | Freeburg et al. | |
| 4,912,756 A | 3/1990 | Hop | |
| 5,119,412 A * | 6/1992 | Attallah | 379/102.07 |
| 5,257,397 A | 10/1993 | Barzegar et al. | |
| 5,410,754 A * | 4/1995 | Klotzbach et al. | 370/466 |
| 5,479,480 A | 12/1995 | Scott | |
| 5,862,474 A * | 1/1999 | Kimball | 455/418 |
| 6,026,119 A | 2/2000 | Funk et al. | |
| 6,111,866 A * | 8/2000 | Kweon et al. | 370/335 |
| 6,782,417 B1 * | 8/2004 | Rao | 709/217 |
| 6,804,820 B1 * | 10/2004 | Meric et al. | 719/321 |
| 6,907,265 B1 * | 6/2005 | Holmstrom et al. | 455/557 |
| 7,113,503 B1 * | 9/2006 | Basore et al. | 370/352 |
| 7,460,525 B2 * | 12/2008 | Moore, Jr. | 370/354 |
| 7,606,156 B2 * | 10/2009 | DeLangis | 370/235 |
| 2001/0053133 A1 * | 12/2001 | Horikawa | 370/328 |
| 2002/0199003 A1 * | 12/2002 | Sacca | 709/228 |
| 2003/0210679 A1 * | 11/2003 | Grove et al. | 370/352 |
| 2004/0052376 A1 * | 3/2004 | Fisher et al. | 380/257 |
| 2004/0117653 A1 * | 6/2004 | Shapira et al. | 713/201 |
| 2004/0213152 A1 * | 10/2004 | Matuoka et al. | 370/230 |
| 2006/0067350 A1 * | 3/2006 | Clevy et al. | 370/419 |
| 2006/0203807 A1 * | 9/2006 | Kouretas et al. | 370/352 |
| 2006/0268820 A1 * | 11/2006 | Mahkonen et al. | 370/349 |
| 2007/0032225 A1 * | 2/2007 | Konicek et al. | 455/417 |

(Continued)

FOREIGN PATENT DOCUMENTS

EP  1775888 A2 *  4/2007

OTHER PUBLICATIONS

Panian et al, The IP Modem Interface Standard Draft, Jan. 1999.*

(Continued)

*Primary Examiner* — Andy Rao
*Assistant Examiner* — Shan Elahi

(57) ABSTRACT

An Internet Protocol (IP) controlled modem receives a single modem command packet from a user IP system. The modem command packet indicates a destination IP address, a destination IP port number, and a modem command to initiate a voice call. The IP controlled modem determines if the destination IP address and the destination IP port number are authorized for modem control. If the destination IP address and the destination IP port number are authorized for modem control, then the IP controlled modem processes the modem command to wirelessly transfer call set-up signaling to a wireless communication network to initiate the voice call. The IP controlled modem receives a user data packet from the user IP system and wirelessly transfers the user data packet over the voice call.

18 Claims, 5 Drawing Sheets

U.S. PATENT DOCUMENTS

| | | | |
|---|---|---|---|
| 2007/0248075 A1* | 10/2007 | Liu et al. ..................... 370/349 |
| 2008/0117958 A1* | 5/2008 | Pattenden et al. ............ 375/222 |
| 2009/0116428 A1* | 5/2009 | Yi et al. ........................ 370/328 |
| 2009/0207836 A1* | 8/2009 | Kawasaki et al. ............ 370/352 |

OTHER PUBLICATIONS rfc3315, Dynamic Host Configuration Protocol for IPv6, Jun. 2003.*

Portable Computer and Communications Association, "AT via IP (ATVIP) Standard Draft Version 1.0," Jan. 17, 2002, pp. 1-7, Modem Standards Committee, Hood River, Oregon.

Portable Computer and Communications Association, "The IP Modem Interface Standard Draft," Jan. 11, 1999, pp. 1-36, Modem Standards Committee, Brookdale, California.

Portable Computer and Communications Association, "The Standards and Architecture Committee Historical Specifications and Standards," Aug. 26, 2009, 2 pages, Standards and Architecture Committee, Hood River, Oregon.

Telecommunications Industry Association, "TIA-678-A Data Transmission Systems and Equipment—Serial Asynchronous Automatic Dialing and Control for Character Mode DCE on Wireless Data Services," Sep. 3, 2004, 2 pages, Telecommunications Industry Association, Arlington, Virginia.

Wikipedia, "Telnet," Feb. 15, 2010, 4 pages, wikipedia.org, http://en.wikipedia.org/wiki/Telnet.

* cited by examiner

INTERNET PROTOCOL CONTROLLED MODEM FOR USE OVER A WIRELESS VOICE NETWORK

TECHNICAL BACKGROUND

A user data device can use a voice modem to initiate a voice call to an internet service provider and then exchange data packets over the Internet through the voice modem and the internet service provider. The user data device may remotely control the voice modem by establishing a control session over serial connection between the user device and the voice modem. One example of a protocol for modem control sessions is TELNET.

Many wireless communication devices are capable of multi-mode communication. For example, a wireless phone may have a voice communication mode, an Internet data mode, and a Local Area Network (LAN) data mode. Some of these multi-mode communication devices include a voice modem capability to transfer data packets over voice calls through wireless communication networks.

Thus, the user data device may remotely control the wireless communication device by using a modem control protocol to establish a modem control session over a connection to the wireless communication device. Over the modem control session, the user data device controls the wireless communication device to initiate a voice call through a wireless communication network. The user data device may then exchange data packets over the voice call through the wireless communication device and the wireless communication network.

OVERVIEW

An Internet Protocol (IP) controlled modem receives a single modem command packet from a user IP system. The single modem command packet indicates a destination IP address, a destination IP port number, and a modem command to initiate a voice call. The IP controlled modem determines if the destination IP address and the destination IP port number are authorized for modem control. If the destination IP address and the destination IP port number are authorized for modem control, then the IP controlled modem processes the modem command to wirelessly transfer call set-up signaling to a wireless communication network to initiate the voice call. The IP controlled modem receives a user data packet from the user IP system and wirelessly transfers the user data packet over the voice call.

DETAILED DESCRIPTION

Figure 1:
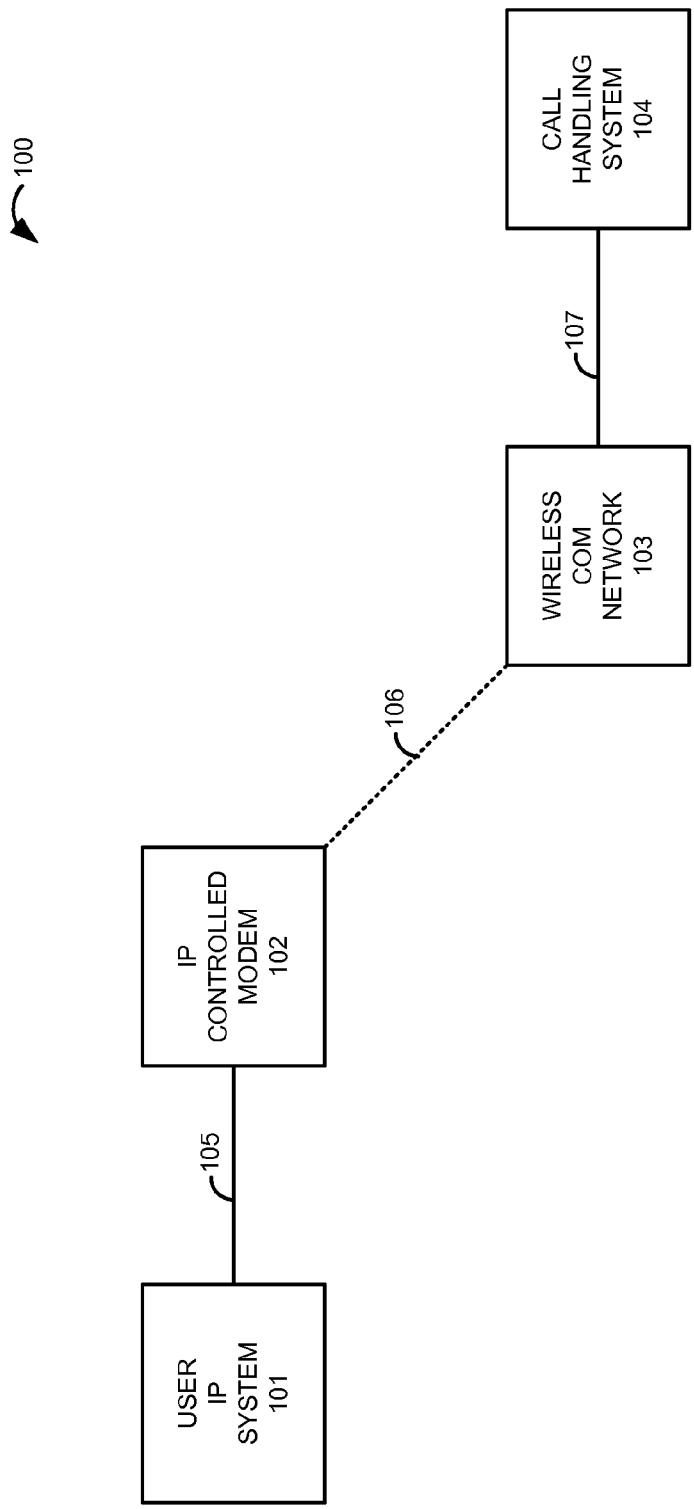
FIG. 1 illustrates a communication system that includes an IP-controlled modem.

FIG. 1 illustrates communication system 100. Communication system 100 comprises user IP system 101, IP-controlled modem 102, wireless communication network 103, and call-handling system 104. User IP system 101 and IP-controlled modem 102 communicate over IP communication link 105. IP-controlled modem 102 and wireless communication network 103 communicate over wireless communication link 106. Wireless communication network 103 and call-handling system 104 communicate over telephony communication link 107.

User IP system 101 could be a computer, electronic game, media player, telephone, internet appliance, IP transceiver, or some other data apparatus capable of IP communication. In operation, user IP system 101 transfers a modem command to IP-controlled modem 102 in a single modem command packet. The modem command described below is to initiate a voice call to a called number, but other commands, such as commands to switch lines or hang-up could be implemented in a similar manner.

To access modem control, the single modem command packet needs a destination IP address and IP port that are authorized for modem control. In response to the single modem command packet, IP-controlled modem 102 establishes a voice call over wireless communication network 103 to call-handling system 104. User IP system 101 and call-handling system 104 may then exchange IP packets over IP-controlled modem 102, wireless communication network 103, and communication links 105-107.

Advantageously, the above example illustrates single-packet access to modem control. User IP system 101 did not have to establish a modem control session with IP-controlled modem 102 over a serial connection. User IP system 101 did not have to implement a complex modem control protocol. In contrast, a ubiquitous and efficient technique for modem control is used.

Figure 2:
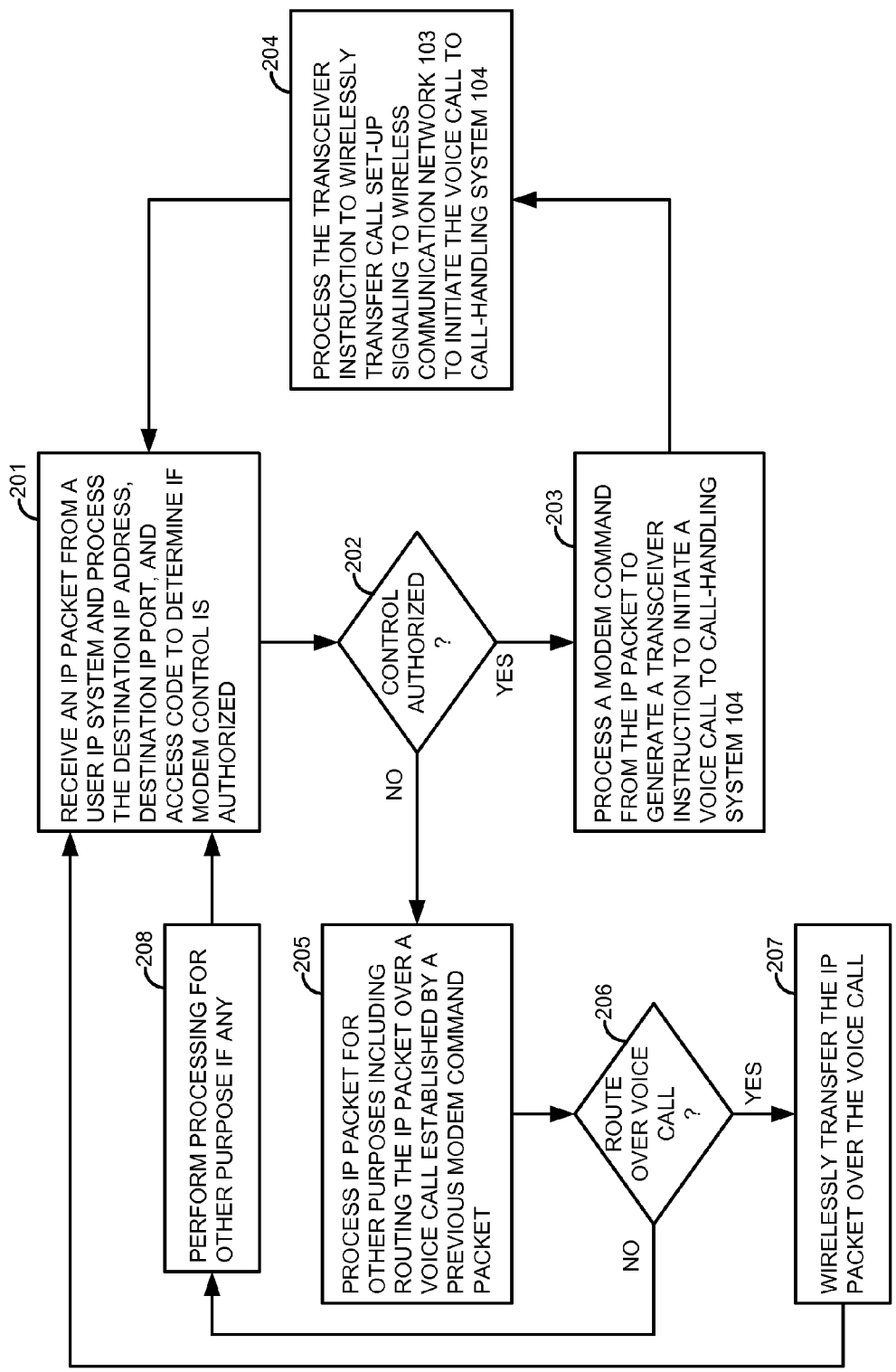
FIG. 2 illustrates the operation of the IP-controlled modem.

FIG. 2 illustrates the operation of IP-controlled modem 102. IP-controlled modem 102 receives a single IP packet from user IP system 101 over IP link 105 (201). IP-controlled modem 102 processes a destination IP address, a destination IP port, and an access code from the single IP packet to determine if the destination IP address, the destination IP port, and the access code are authorized for modem control (201). If modem control is authorized (202), then IP-controlled modem 102 processes a modem command from the single IP packet to generate a transceiver instruction to initiate a voice call to call-handling system 104 (203). IP-controlled modem 102 processes the transceiver instruction transfer call set-up signaling to wireless communication network 103 to initiate the voice call to call-handling system 104 (204).

If modem control for the IP packet is not authorized (202), then IP-controlled modem 102 processes the IP packet for other purposes that include routing the IP packet over a current voice call that was previously initiated by a modem command packet (205). If the IP packet should be routed over the current voice call (206), then IP-controlled modem 102 wirelessly transfers the IP packet to wireless communication network 103 for delivery to call-handling system 104 over the voice call (207). IP-controlled modem 102 may perform address and port translation on the IP packet before transfer to wireless communication network 103. If the IP packet should be not routed over the voice call (206), then IP-controlled modem 102 performs processing for another purpose if any (208).

The access code may be a private code that provides secure access to modem control capability. In some alternative embodiments, the use of an access code could be omitted. In addition, the generation of a transceiver command could be omitted, and the voice call could be directly initiated from the command in the modem control packet.

Figure 3:
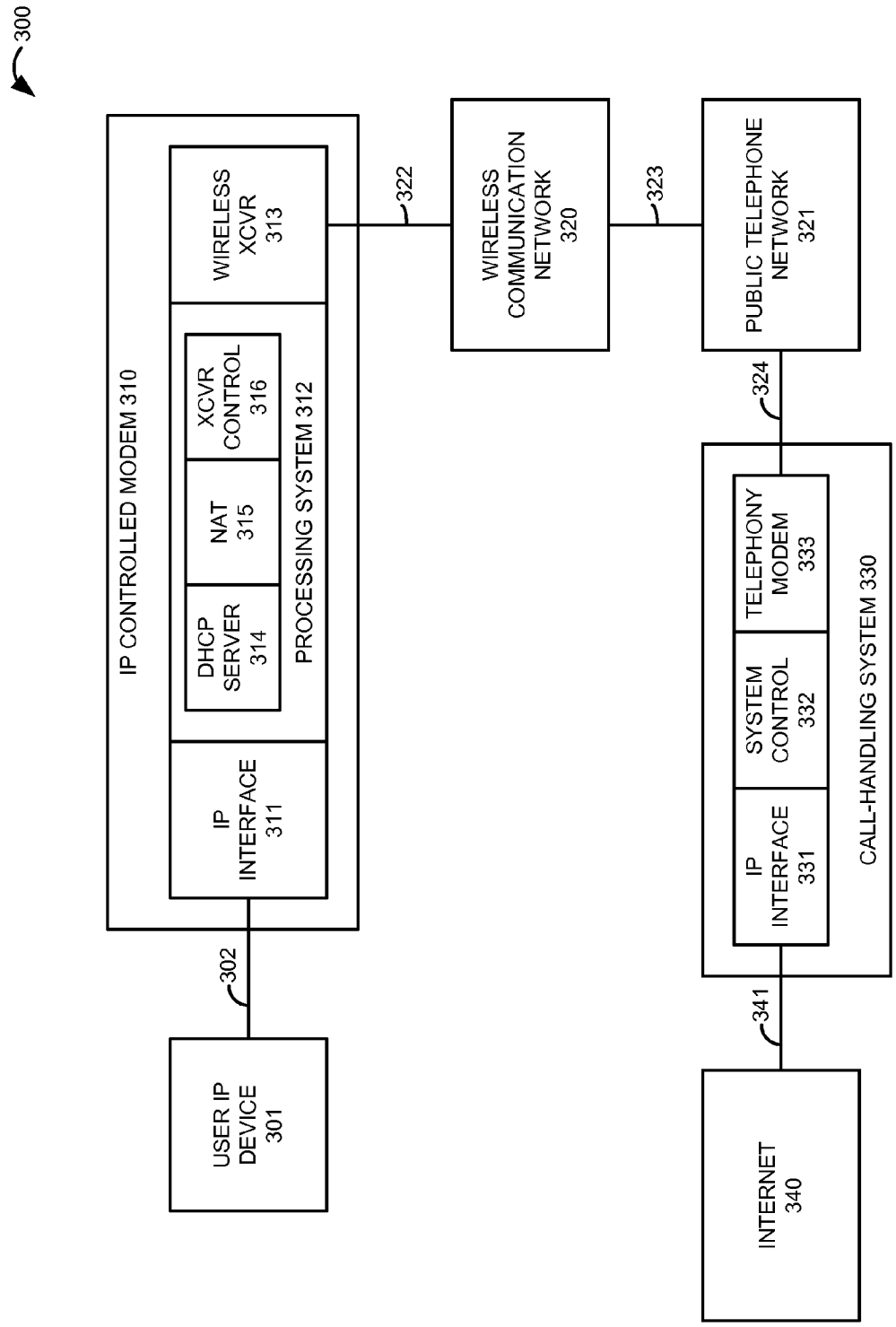
FIG. 3 illustrates a communication system that includes an IP-controlled modem.

FIG. 3 illustrates communication system 300. Communication system 300 is an example of communication system 100, although system 100 may use alternative configurations. Communication system 300 comprises user IP device 301, IP-controlled modem 310, wireless communication network 320, public telephone network 321, call-handling system 330, and internet 340. IP-controlled modem 310 comprises IP interface 311, processing system 312, and wireless transceiver 313. Processing system 312 comprises Dynamic Host Connection Protocol (DHCP) server 314, Network Address Translation (NAT) 315, and transceiver control 316. Call-handling system 330 comprises IP interface 331, system control 332, and telephony modem 333.

User IP device 301 and IP-controlled modem 310 communicate over IP link 302. IP-controlled modem 310 and wireless communication network 320 communicate over wireless link 322. Wireless communication network 320 and public telephone network 321 communicate over network link 323. Public telephone network 321 and call-handling system 330 communicate over network link 324. Call-handling system 330 and internet 340 communicate over internet link 341.

Figure 4:
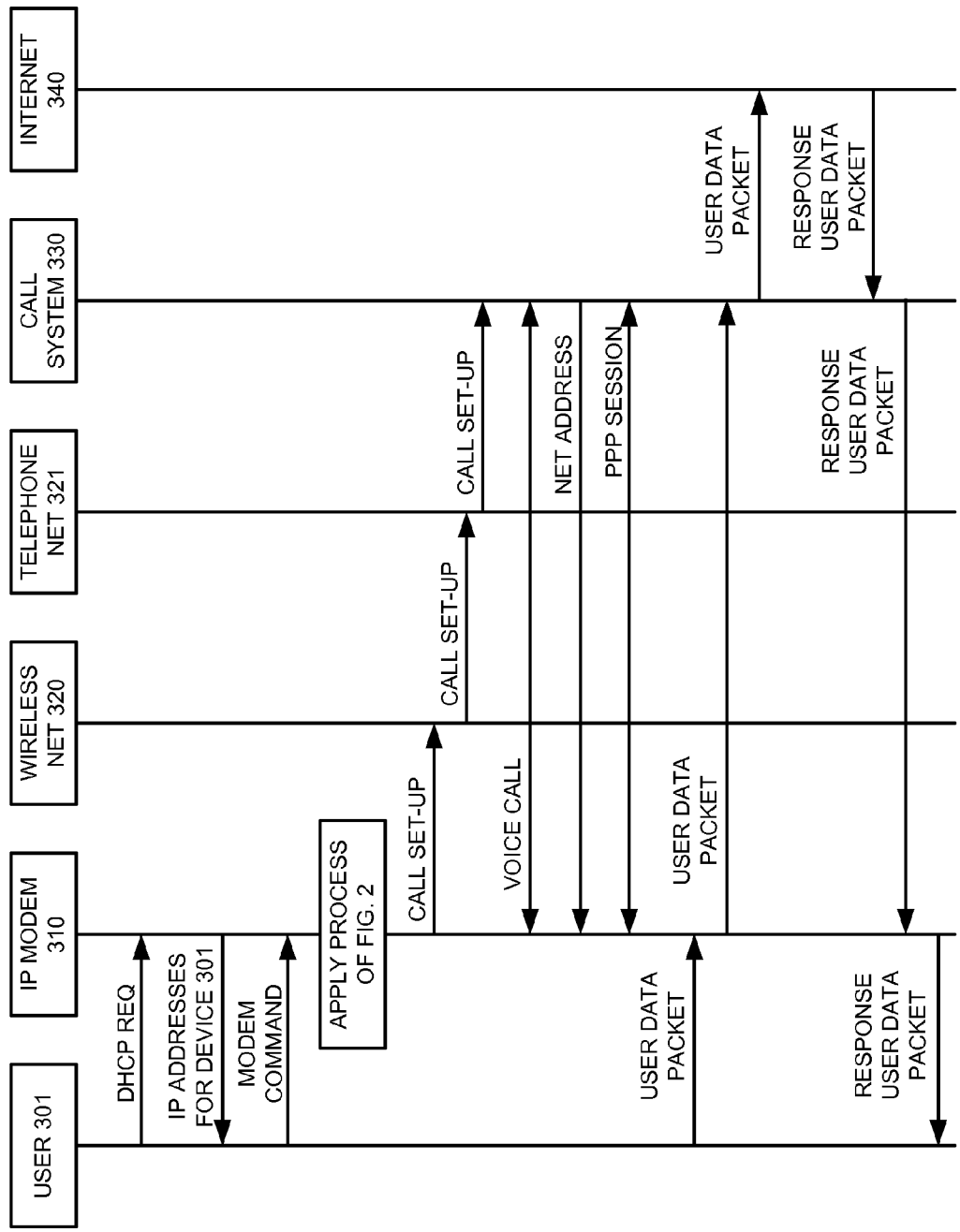
FIG. 4 illustrates the operation of the communication system that includes the IP-controlled modem.

FIG. 4 illustrates the operation of communication system 300 that includes IP-controlled modem 310. User IP device 301 transfers a DHCP request to IP interface 311 of IP-controlled modem 310. DHCP server 314 in IP-controlled modem 310 responds with an IP address for user IP device 301. DHCP server 314 also responds with the authorized destination IP address and destination port number to access modem control.

User IP device 301 then transfers a single modem command packet to IP interface 311 of IP-controlled modem 310. The modem command packet has the authorized destination IP address and port number for modem control. As the source address, the modem command packet uses the IP address provided by DHCP server 314. In IP-controlled modem 310, processing system 312 applies the process of FIG. 2 to determine that the single modem command packet contains an authorized modem command to initiate a voice call to call-handling system 330, and in response, transceiver control 316 generates a corresponding transceiver instruction.

In response to the transceiver instruction, wireless transceiver 316 in IP controlled modem 310 transfers call set-up signaling to wireless communication network 320 to initiate a voice call to call-handling system 330. Wireless communication network 320 processes the set-up signaling to extend the call by transferring call set-up signaling to public telephone network 321. Public telephone network 321 processes the set-up signaling to extend the call by transferring call set-up signaling to call-handling system 330. Telephony modem 333 in call-handling system 330 answers the voice call and interacts with processing system 312 in IP-controlled modem 310 over the voice call to establish a Point-to-Point Protocol (PPP) session between IP-controlled modem 310 and call-handling system 330. Call-handling system 330 provides IP-controlled modem 310 with a network address for use on the PPP session.

User IP device 301 then transfers a user data packet to IP interface 311 of IP-controlled modem 310. As the source address, the user data packet has the IP address for user IP device 301 that was received from DHCP server 314. The user data packet also has a destination IP address and destination port for routing over internet 340. Processing system 312 in IP-controlled modem 310 applies the process of FIG. 2 to determine that the user data packet is not a modem command packet, and that the user data packet should be routed over the voice call. In addition to the destination address, routing over the voice call could be based on the source address which was received from DHCP server 314 and was used in a modem command to open the PPP session over the voice call.

For the user data packet, NAT 315 in IP-controlled modem 310 provides address translation between the source IP address and the network address that was provided to modem 310 by call-handling system 330. In some cases, NAT 315 may also select a network port for the PPP session and provide translation between the source IP address (and port) and the selected network port. In modem 310, wireless transceiver 313 transfers the user data packet over the PPP session to telephony modem 333 in call-handling system 330.

For the user data packet, system control 332 provides address translation between the source network address used on the PPP session and a public source IP address that call-handling system 330 uses on internet 340. In some cases, system control 332 may also select a public IP port and provide translation between the source network port used on the PPP session and the selected public IP port used on internet 340. IP interface 331 in call-handling system 330 transfers the user data packet to internet 340 for subsequent routing and delivery.

Subsequently, IP interface 331 receives a responsive user data packet from internet 340 for delivery to user IP device 301. As the destination address, the response data packet has the public IP address and public IP port used by call-handling system 330. For the response data packet, system control 332 provides address translation between the destination IP address and port used by call-handling system 330 and the destination network address and port for the PPP session. Telephony modem 333 in call-handling system 330 transfers the response user data packet over the PPP session to wireless transceiver 313 in IP-controlled modem 310.

For the response data packet, NAT 315 in IP-controlled modem 310 provides address and port translation between the destination network address and port for the PPP session and the IP address and port assigned to user IP device 301 by DHCP server 314. IP interface 311 transfers the response user data packet to user IP device 301.

Advantageously, the above example illustrates single-packet access to modem control. User IP device 301 did not have to establish a modem control session with IP-controlled modem 310 over a serial connection. User IP device 301 did not have to implement a complex modem control protocol. In contrast, a ubiquitous and efficient technique for modem control was used.

Figure 5:
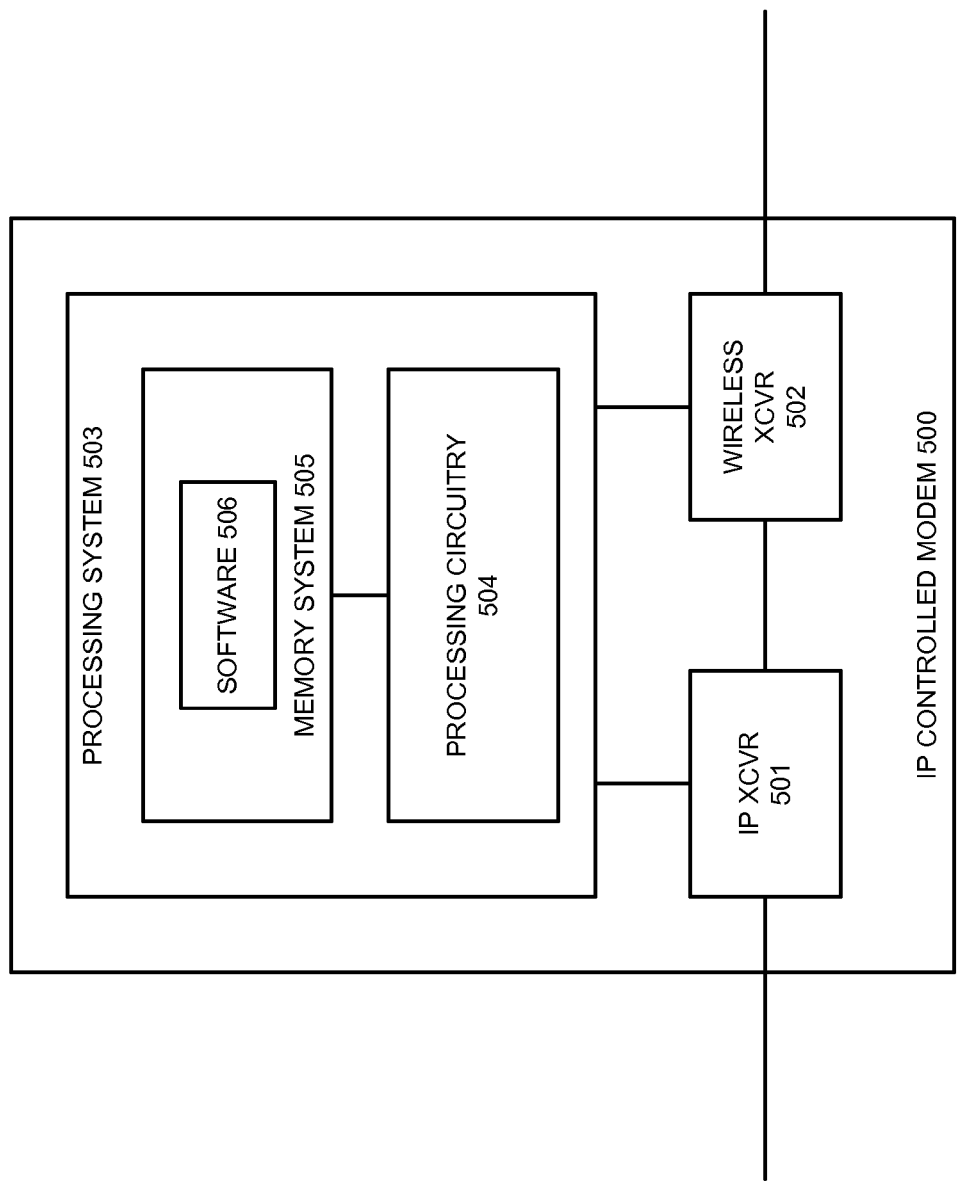
FIG. 5 illustrates an IP-controlled modem.

FIG. 5 illustrates IP-controlled modem 500. IP-controlled modem 500 is an example of IP-controlled modems 102 and 310, although modems 102 and 310 may use alternative configurations. IP-controlled modem 500 could be a discrete system, a distributed system, and/or could be integrated into other systems, such as telephones, computers, appliances, and the like. IP-controlled modem 500 comprises IP transceiver 501, wireless transceiver 502, and processing system 503. Processing system 503 comprises processing circuitry 504 and memory system 505 that stores operating software 506. Processing system 503 is linked to transceivers 501-502. IP-controlled modem 500 may include other well-known components that are not shown for clarity, such as additional communication interfaces, user interfaces, enclosure, power supply, and the like.

IP transceiver 501 comprises a communication port, signal processing circuitry, software, and/or some other communication components. IP transceiver 501 may include an antenna and Radio Frequency (RF) circuitry if wireless communication is used. IP transceiver 501 exchanges DHCP packets, modem command packets, and user data packets as described herein.

Wireless transceiver 502 comprises an antenna, filter, amplifier, signal processing circuitry, software, and/or some other communication components. Wireless transceiver 502 may use various wireless communication formats, such as Code Division Multiple Access (CDMA), Global System for Mobile Communications (GSM), Evolution Data Only (EVDO), Worldwide Interoperability for Microwave Access (WIMAX), High Speed Packet Access (HSPA), Long Term Evolution (LTE), or some other wireless communication format—including combinations thereof. Wireless transceiver 502 transmits and receives wireless signals to initiate voice calls, initiate PPP sessions, and exchange user data packets as described herein for modems 102 and 310.

Processing circuitry 504 comprises microprocessor and other circuitry that retrieves and executes operating software 506 from memory system 505. Memory system 505 comprises a computer-readable storage medium, such as a disk drive, flash drive, data storage circuitry, or some other memory apparatus. Memory system 505 could be a single device or be distributed across multiple devices. Processing circuitry 504 is typically mounted on one or more circuit boards that may also hold memory system 505 and portions of transceivers 501-502.

Operating software 506 comprises computer programs, firmware, or some other form of computer-readable processing instructions. Operating software 506 may include an operating system, utilities, drivers, network interfaces, applications, or some other type of software. When executed by processing circuitry 504, operating software 506 directs processing system 503 to operate IP-controlled modem 500 as described herein for modems 102 and 310. In particular, operating software 506 directs processing system 503 to interpret and execute modem command packets to initiate voice calls and PPP sessions and to exchange user data packets as described herein. Operating software 506 may also direct processing system 503 to provide DHCP service and provide address and port translations.

Referring back to FIG. 1, user IP system 101 could be a computer, electronic game, media player, telephone, internet appliance, IP transceiver, or some other data apparatus capable of IP communication. IP-controlled modem 102 comprises communication circuitry for IP communication and for wireless communication. The IP communication circuitry typically includes a communication port, processing circuitry, memory, and software. The wireless communication circuitry typically includes an amplifier, filter, RF modulator, and signal processing circuitry and software. IP-controlled modem 102 includes a processing system to provide a modem command interface and to direct wireless network access.

Wireless communication network 103 comprises antennas and RF communication circuitry for wireless communication. The RF communication circuitry typically includes amplifiers, filters, RF modulators, and signal processing circuitry. The signal processing circuitry implements the wireless communication format. Wireless communication network 103 also comprises processing circuitry, memory, software, and network communication interfaces. Wireless communication network 103 may also include routers, servers, call processors, computer systems, communication links, and other communication network elements.

Call-handling system 104 comprises processing circuitry, memory, software, and network communication interfaces. Call-handling system 104 may also include computers, routers, servers, and other network components.

Wireless communication link 106 uses the air or space as the transport media. Wireless communication link 106 may use various protocols, such as CDMA, GSM, EVDO, WIMAX, HSPA, LTE, or some other wireless communication format—including combinations thereof. Wireless communication link 106 could be a direct link or may include intermediate networks, systems, or devices.

Communication links 105 and 107 use metal, glass, air, space, or some other material as the transport media. Communication links 105 and 107 may use various communication protocols, such as TDM, IP, Ethernet, wireless, or some other communication format—including combinations thereof. Communication links 105 and 107 could be direct links or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. An Internet Protocol (IP) controlled modem device comprising:
   an IP communication interface portion configured to receive a single modem packet from a user IP system, wherein the single modem packet comprises a destination IP address, a destination IP port number, an access code, and a modem command to initiate a voice call;
   a processing system portion configured to determine if the access code, the destination IP address, and the destination IP port number are authorized for modem control, and only if the access code, the destination IP address, and the destination IP port number are all authorized for modem control, then to process the modem command to generate a corresponding transceiver instruction to initiate the voice call;
   a wireless transceiver portion configured to process the transceiver instruction to wirelessly transfer call set-up signaling to a wireless communication network to initiate the voice call;
   the IP communication interface portion is configured to receive a user data packet; and
   the wireless transceiver portion is configured to wirelessly transfer the user data packet over the voice call.

2. The IP controlled modem device of claim 1 wherein the modem command, the transceiver instruction, and the call set-up signaling indicate a destination telephone number for the voice call and wherein the destination telephone number is for a call-handling system that includes a modem that is configured to receive the user data packet over the voice call.

3. The IP controlled modem device of claim 2 wherein the processing system portion is configured to establish a point-to-point protocol connection with the call-handling system over the voice call.

4. The IP controlled modem device of claim 3 wherein:
   the IP communication interface portion is configured to receive a Dynamic Host Configuration Protocol (DHCP) request from the user IP system;
   the processing system portion is configured to process the DHCP request to select a user IP address for the user IP system; and
   the IP communication interface portion is configured to transfer the user IP address for delivery to the user IP system.

5. The IP controlled modem device of claim 4 wherein the single modem packet and the user data packet from the user IP system have the user IP address as a source address.

6. The IP controlled modem device of claim 5 wherein the wireless transceiver portion is configured to wirelessly receive a network address over the voice call.

7. The IP controlled modem device of claim 6 wherein the processing system portion is configured to provide address translation between the user IP address and the network address.

8. The IP controlled modem device of claim 7 wherein the processing system portion is configured to select a network port for the user system and to provide address translation between the user IP address and the network port.

9. The IP controlled modem device of claim 8 wherein the voice call is to a call-handling system that is configured to provide address translation between the network address and a public IP address and between the network port and an IP port.

10. A method of operating an Internet Protocol (IP) controlled modem device which is performed by the IP controlled modem device, the method comprising:
  in an IP communication interface portion of the IP controlled modem device, receiving a single modem packet from a user IP system, wherein the single modem packet comprises a destination IP address, a destination IP port number, an access code, and a modem command to initiate a voice call;
  in a processing system portion of the IP controlled modem device, determining if the access code, the destination IP address, and the destination IP port number are authorized for modem control, and only if the access code, the destination IP address and the destination IP port number are all authorized for modem control, then processing the modem command to instruct a wireless transceiver portion of the IP controlled modem device to wirelessly transfer call set-up signaling to a wireless communication network to initiate the voice call;
  in the IP communication interface portion of the IP controlled modem device, receiving a user data packet from the user IP system; and
  in the wireless transceiver portion of the IP controlled modem device, wirelessly transferring the user data packet over the voice call.

11. The method of claim 10 wherein the modem command, the transceiver instruction, and the call set-up signaling indicate a destination telephone number for the voice call and wherein the destination telephone number is for a call-handling system that includes a modem that is configured to receive the user data packet over the voice call.

12. The method of claim 11 wherein wirelessly transferring the user data packet over the voice call comprises, in the wireless transceiver portion of the IP controlled modem device, establishing a point-to-point protocol connection with the call-handling system over the voice call.

13. The method of claim 12 further comprising:
  in the IP communication interface portion of the IP controlled modem device, receiving a Dynamic Host Configuration Protocol (DHCP) request from the user IP system;
  in the processing system portion of the IP controlled modem device, processing the DHCP request to select a user IP address for the user IP system; and
  in the IP communication interface portion of the IP controlled modem device, transferring the user IP address for delivery to the user IP system.

14. The method of claim 13 wherein the single modem packet and the user data packet from the user IP system have the user IP address as a source address.

15. The method of claim 14 wherein establishing a point-to-point protocol connection comprises wirelessly receiving a network address in the IP controlled modem device over the voice call.

16. The method of claim 15 further comprising, in the processing system portion of the IP controlled modem device, providing address translation between the user IP address and the network address.

17. The method of claim 16 further comprising, in the processing system portion of the IP controlled modem device, selecting a network port for the user system and providing address translation between the user IP address and the network port.

18. The method of claim 17 wherein the voice call is to a call-handling system that is configured to provide address translation between the network address and a public IP address and between the network port and an IP port.

* * * * *